United States Patent [19]

Auth

[11] Patent Number: 5,002,394

[45] Date of Patent: Mar. 26, 1991

[54] FABRICATING INTERFEROMETERS HAVING REDUCED MISALIGNMENT PROBLEMS

[75] Inventor: Gerald L. Auth, Laguna Beach, Calif.

[73] Assignee: Midac Corporation, Costa Mesa, Calif.

[21] Appl. No.: 472,170

[22] Filed: Jan. 30, 1990

[51] Int. Cl.⁵ .............................................. G01B 9/02
[52] U.S. Cl. .................................................. 356/346
[58] Field of Search ........................ 356/346; 350/321

[56]  References Cited

U.S. PATENT DOCUMENTS

| | | | |
|---|---|---|---|
| 3,936,193 | 2/1976 | Auth | 356/346 |
| 4,671,656 | 6/1987 | Auth | 356/346 |
| 4,810,092 | 3/1989 | Auth | 356/346 |
| 4,844,614 | 7/1989 | Henderson et al. | 356/346 |

Primary Examiner—Samuel Turner
Attorney, Agent, or Firm—Thomas J. Plante

[57]  ABSTRACT

An interferometer structure is disclosed in which alignment problems are reduced by providing a special retaining structure for the transparent beamsplitter plates. In order to minimize distortion of the beamsplitter plates, the metal housing surfaces, against which they are held, are each coated with a material which has a very slippery and extremely flat surface engaging the surface of the respective beamsplitter plate. The preferred coating material is polytetrafluoroethylene. A glass tool (optically flat) is used during heating (and hardening) of the coating material, for the purpose of insuring an unusually flat coating surface.

13 Claims, 5 Drawing Sheets

FABRICATING INTERFEROMETERS HAVING REDUCED MISALIGNMENT PROBLEMS

BACKGROUND OF THE INVENTION

The present invention deals with the problems of misalignment in interferometers, particularly misalignment due to temperature changes. Serious functional problems occur in interferometers if, in spite of initial careful alignment, events occur which cause the alignment accuracy to be lost.

Problems of this type have been persistent difficulties in the interferometer field. The present applicant has tried various concepts in an effort to solve misalignment problems, and thus improve interferometer performance. Diagnoses of the causes of the problems have been highly speculative, and lacking in conceptual absolutes. However, the concepts herein disclosed appear to provide major benefits, substantially reducing misalignment problems, and thereby improving interferometer performance to an extent which may constitute an order of magnitude.

SUMMARY OF THE INVENTION

The present invention is based on experimental evidence that a major cause of misalignment is distortion of the beamsplitter. The beamsplitter material, such as potassium bromide (KBr) or cesium iodide (CsI), is held in an aluminum mounting. The relative softness of the beamsplitter material, and its much higher temperature expansion coefficient (compared to aluminum) have been identified as major obstacles to alignment maintenance.

Two concepts have been individually and collectively responsible for the improved performance obtained by the present invention. One is the concept of permitting very easy sliding movement of the beamsplitter material against the surface which it engages. The other is the concept of obtaining maximum flatness of that surface.

Both of these objectives involve the use of a suitable slippery coating on the metal surface (usually aluminum) which supports the beamsplitter material. The flatness improvement also involves manufacturing techniques used during formation of the coating surface on the aluminum.

BRIEF DESCRIPTION OF THE DRAWINGS

FIGS. 2 and 3 show the smaller housing portion, which contains the fixed mirror.

FIGS. 4 and 5 show the larger housing portion, which contains the moving mirror.

DETAILED DESCRIPTION OF THE PREFERRED EMBODIMENT

Figure 1:
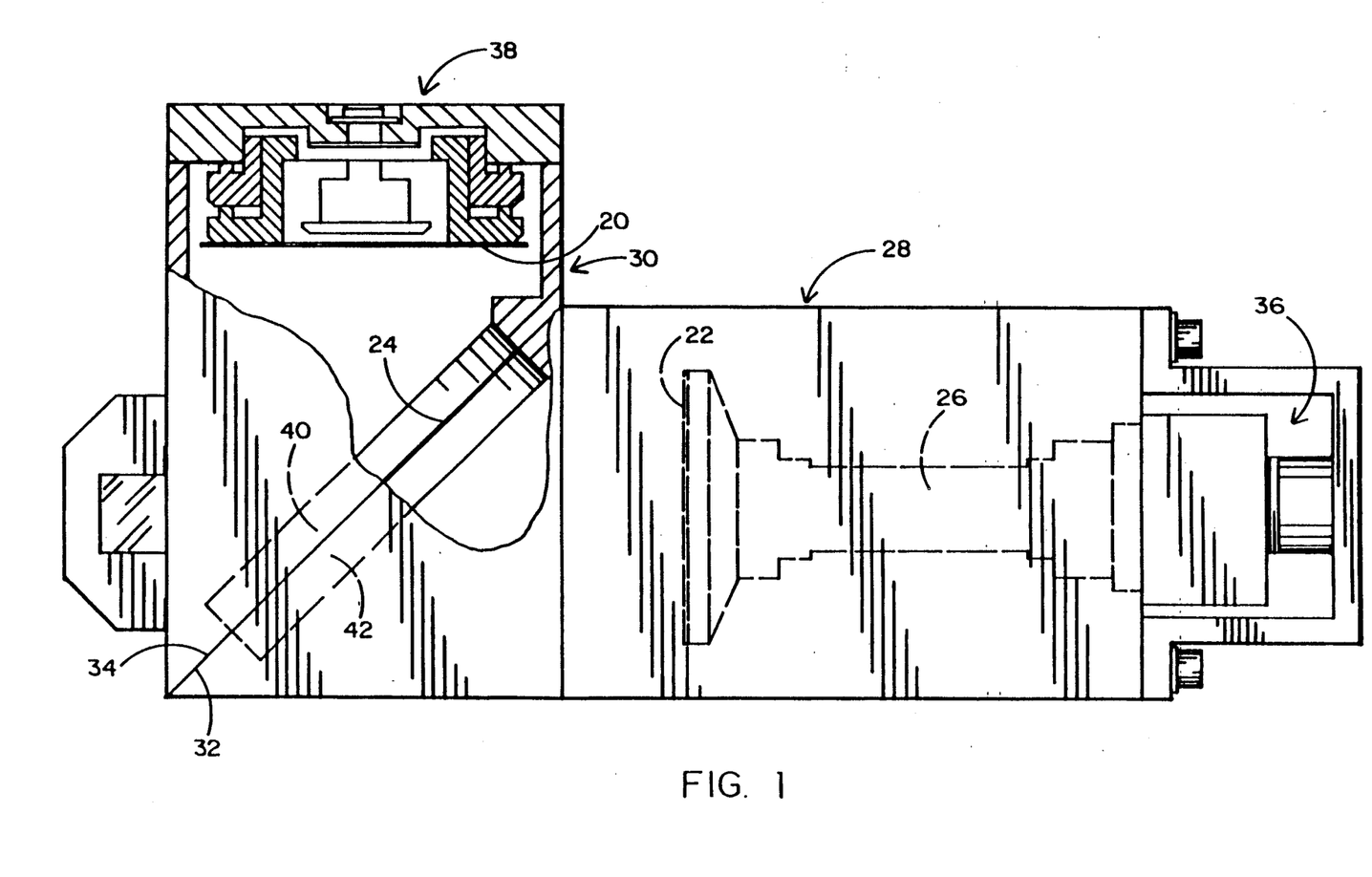
FIG. 1 is a plan view of an interferometer in which the present invention may be incorporated.

FIG. 1 is a plan view of an interferometer comprising two flat mirrors and a beamsplitter. A non-moving mirror 20 is at the end of one interferometer arm. A moving mirror 22 is at the end of the other interferometer arm. A beamsplitter surface 24 causes incoming infrared (IR) radiation from a source (not shown) to be partially reflected toward one flat mirror and partially transmitted toward the other flat mirror. After reflection by the respective flat mirrors 20 and 22, the returning beams are recombined at the beamsplitter, and directed toward a sample and a detector (not shown). The interference of the two beams, one of which has a varying length due to movement of mirror 22, creates an interferogram. Mirrors other than flat mirrors may be used, e.g., retro-reflectors.

The interferometer components are mounted in a suitable housing. In the illustrated version of the invention, the housing is formed of aluminum, and comprises two portions, a first larger portion 28 and a second smaller portion 30. The two housing portions 28 and 30 are joined at their engaging end surfaces 32 and 34, which are formed at a 45° angle to the intersecting axes of the interferometer.

Because the present invention deals with beamsplitter improvements, and because beamsplitters are standard components of most interferometers, the present invention is applicable to all versions of such interferometers. However, the invention is illustrated in conjunction with an interferometer of the type shown in common assignee U.S. Pat. No. 4,693,603, which has attained significant commercial usage.

The moving mirror 22 in FIG. 1 is on the front end of a movable element 26, which is supported by a parallelogram arrangement (not shown) above element 26, and which is driven in reciprocating motion by a linear motor 36. Reference may be had to U.S. Pat. No. 4,693,603 for a more detailed description of that interferometer.

The present invention is concerned with the problems encountered in maintaining optical alignment of the interferometer. Initially, alignment is attained, preferably at the plant of the interferometer supplier, by means of careful adjustment of the non-moving mirror 20. This mirror may be adjusted by rotating wedge-shaped adjustors behind the mirror, until precise initial alignment has been obtained. The adjusting mechanism is generally identified by the numeral 38. Various adjustment techniques may be used. An example of a preferred technique is disclosed in common assignee U.S. Pat. No. 4,671,656, which may be referred to for additional information. A laser beam is generally used in initial adjustment (alignment). The ideal alignment is attained when a temporary viewing screen shows an interference pattern in which a single "fringe" fills the screen.

When the pre-aligned interferometer is put into use, misalignment of the interferometer often occurs. The problem may be exacerbated by use of the interferometer in certain demanding environments, such as process control on-line analysis. Not only have effective misalignment preventative measures been lacking; the analysis (diagnosis) of the causes of such misalignment have generally been inadequate.

Understanding the development of the present invention requires substantial information concerning the problem as initially perceived by the applicant, and a series of efforts to find an adequate solution for the problem.

One of the recognized causes of alignment problems is the occurrence of thermal changes. During its warm up to its normal operating temperature, the interferometer temperature will increase 30°-40° above ambient temperature. Thus, recurring temperature changes occur during warming up and cooling down of the interferometer. Even greater thermal changes may be caused by ambient temperature variations due to environmental conditions. For example, ambient temperatures may vary over a range which extends 75° or 100°.

As development work proceeded toward improvement of interferometers supplied by the assignee of this application, many simultaneous interacting effects created difficulties in isolating specific performance problems. Thus, the effort to diagnose causes of certain undesired effects has required some very subtle considerations.

In April, 1988 experiments showed that the largest source of alignment drift in the interferometer of FIG. 1 was distortion of the shape of the aluminum interferometer housing 28 by the steel linear motor 36, as the temperature of the complete assembly changed. The difference between the thermal coefficient of expansion for aluminum and steel caused great stresses to develop where the parts were rigidly fastened together. These stresses resulted in distortions that caused the alignment of the moving mirror, relative to the beamsplitter and fixed mirror, to change as the interferometer went from room temperature to operating temperature. Once this major source of distortion was eliminated, other more subtle sources of drift could be studied.

Thereafter, since the design of fixed mirror 20 and its adjustment mechanism 38 had been refined to a point where its thermal drift contribution was negligible, attention was first concentrated on the moving mirror 22, and subsequently on the beamsplitter 24. The moving mirror suspension system was analyzed, and steps were taken to assure consistent preloading of the ball bearings used in the arms supporting the moving mirror.

The crucial aspect of the beamsplitter mounting was not fully appreciated until a similarity of temperature-caused alignment drifting appeared in a particular interferometer both with an improved moving mirror support and with a nonimproved moving mirror support. This observation led to an intensified study of beamsplitter reactions to temperature change.

The beamsplitter construction includes two transparent plates 40 and 42, one of which carries the coating 24 which creates the beamsplitter effect. The beamsplitter plates are usually formed of potassium bromide (KBr). Other crystalline salt materials may be used, e.g., cesium iodide, quartz, zinc sulfide, zinc selenide, etc. Plate 40 in FIG. 1 is the carrier of the coating 24; and the other plate 42 provides optical compensation for the first plate. Optical compensation is needed to balance the radiation paths in the two arms of the interferometer.

The beamsplitter coating, or surface, 24 must remain as flat as possible, in order to avoid optical misalignment problems. When the KBr plates 40 and 42 are caused to distort, as they often are, major alignment problems occur. It appears that such distortions are often caused by the interaction between the KBr plates and the aluminum surfaces against which they are retained. If warping of the beamsplitter occurs, a very undesirable fringe pattern develops.

One technique used in an effort to minimize warping of the KBr plates is insertion of one or more foam rubber pads (not shown) between the beamsplitter plates 40 and 42. This reduces pressure on the plates when the two portions 28 and 30 of the aluminum housing are fastened together by suitable threaded members. However, the insertion of the relatively soft pads did not prevent distortion and warping of the beamsplitter plates.

Further diagnosis has blamed the beamsplitter distortion problem primarily on interaction (friction) between the beamsplitter plates and the aluminum surfaces which they engage. Such friction is caused by relative motion due to thermal changes. Aluminum and KBr have very different thermal expansion coefficients. Aluminum has a thermal expansion coefficient of $20 \times 10^{-6}$ per C°, and KBr has a thermal expansion coefficient of $43 \times 10^{-6}$ per C°. CsI has a thermal expansion coefficient of approximately $120 \times 10^{-6}$ per C°. If there is substantial friction between the aluminum surfaces and the beamsplitter plates due to temperature changes, the relatively soft material of the beamsplitter plates will be distorted.

When thermal change occurs, there must be relative sliding motion between each beamsplitter plate and its aluminum supporting surface. FIGS. 2-5 show the aluminum housing portions, and the aluminum surfaces against which the beamsplitter plates are held in the assembled interferometer. It should be emphasized that the housing structure disclosed in this application is only illustrative. The benefits of the present invention are applicable in any situation where beamsplitter plates may be distorted due to friction with their supporting (retaining) surfaces. For example, in some interferometers, the beamsplitter and its supporting structure are inserted into the interferometer housing, either as a unit, or separately. In any case, the beamsplitter supporting structure has surfaces engaging the beamsplitter plates.

Figures 2, 4:
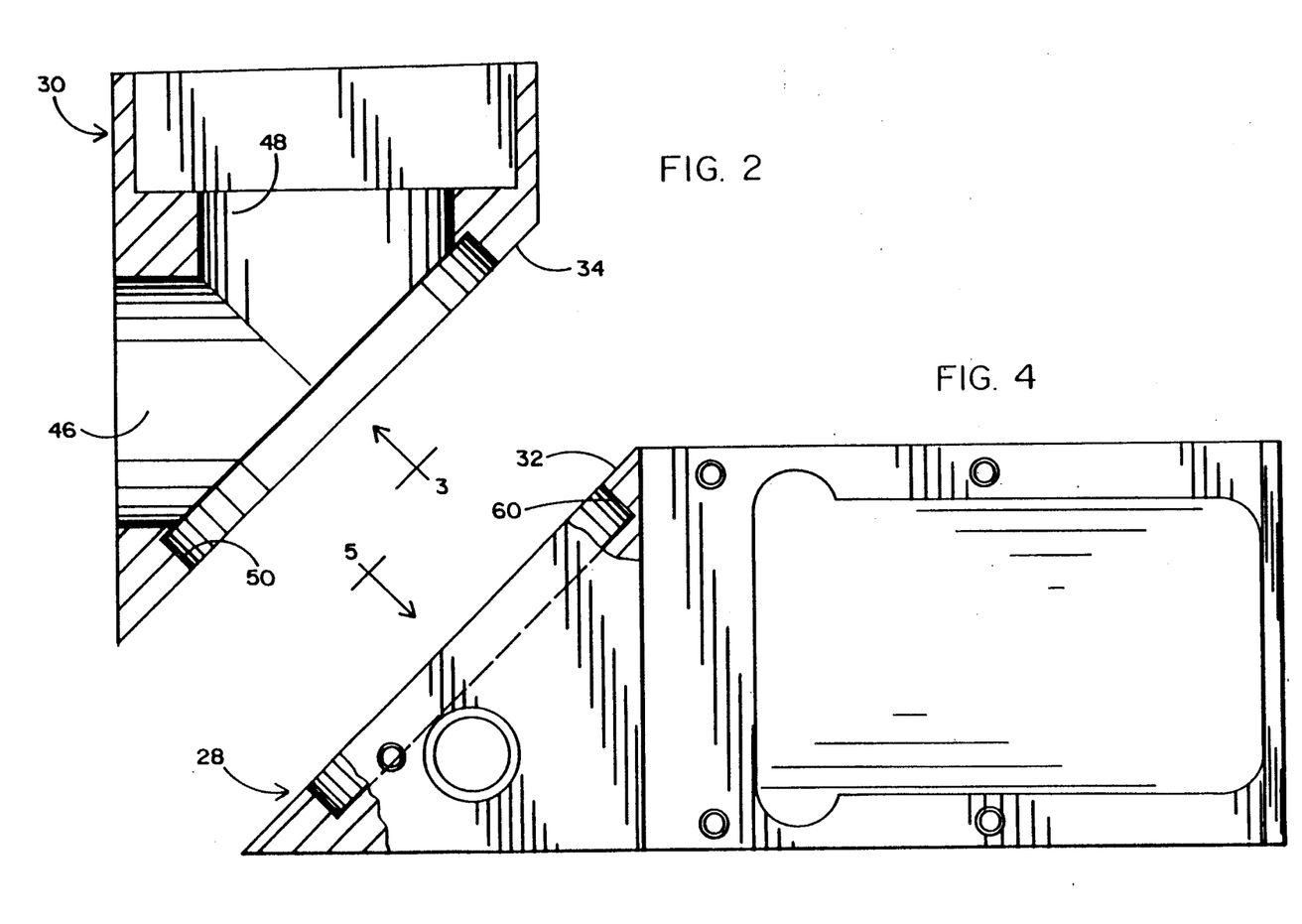
FIG. 2 is a cross-sectional view on a horizontal plane.
FIG. 4 is a partly-sectional top view.
Figure 3:
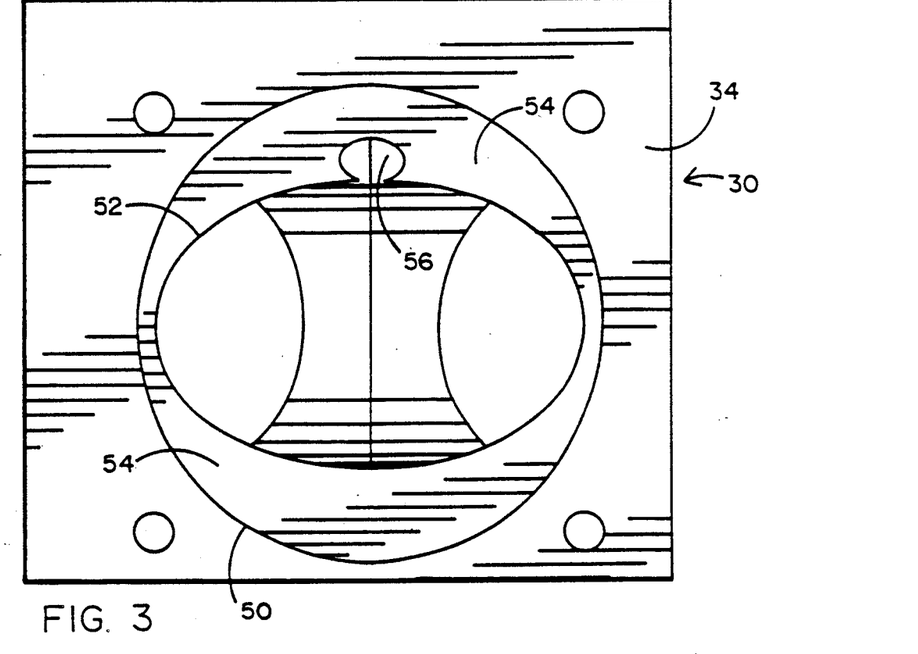
FIG. 3 is a view of the end of the housing portion which engages the other housing portion.

In FIGS. 2 and 3, the smaller housing portion 30 is shown. A round bore 46 is provided to receive the source-supplied IR radiation. Another round bore 48 intersects bore 46 at a 90° angle, and constitutes the passage for radiation to and from the fixed mirror 20. The end face 34 of housing portion 30 lies in a plane which is at a 45° angle to the axes of bores 46 and 48. A round counterbore 50, having a larger diameter than bores 46 and 48, is formed in the end 34 of housing portion 30; and the beamsplitter plate 40 is adapted to fit into counterbore 50. Because of the 45° angle of face 34 relative to the axes of bores 46 and 48, the intersecting bores 46 and 48 form an essentially elliptical intersection 52, as seen in FIG. 3. An aluminum surface 54 is provided, against which the peripheral portions of the surface of beamsplitter plate 40 are held. It is this aluminum surface 54 whose friction against the beamsplitter plate 40, during thermal changes, may cause distortion of the plate, and misalignment of the interferometer.

Figure 5:
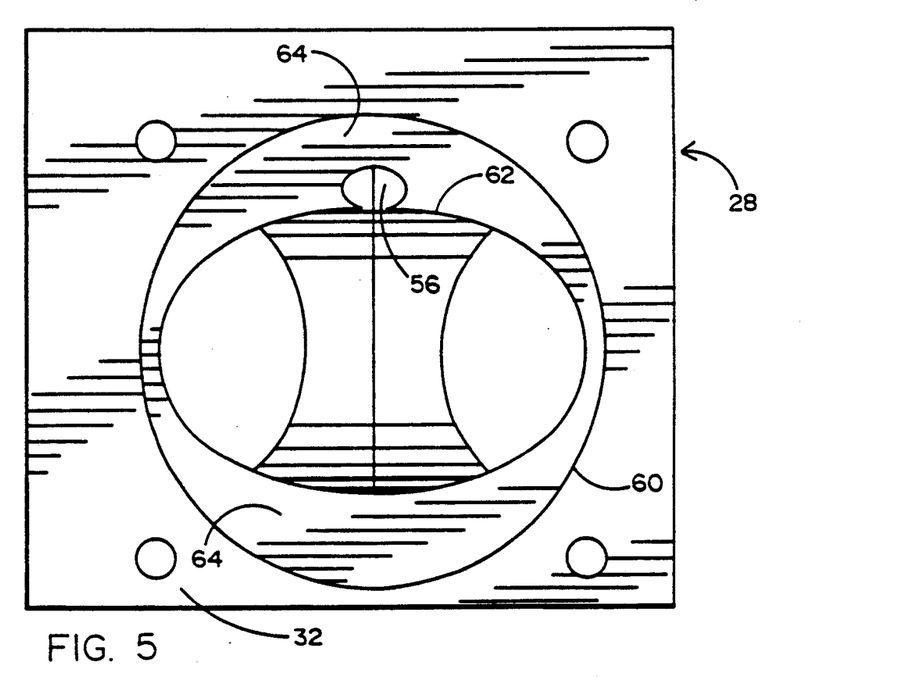
FIG. 5 is a view of the end of the housing portion which engages the other housing portion.

As shown in FIGS. 4 and 5, an identical situation exists at the beamsplitter end of the larger housing portion 28. A round bore (not shown) is provided for the IR radiation exiting the interferometer on its way to the sample and the detector. Another round bore (not shown) intersects the exiting bore at a 90° angle, and constitutes the passage for radiation to and from the moving mirror 22. The end face 32 of housing portion 28 lies in a plane which is at a 45° angle to the axes of the two bores. A round counterbore 60, having a larger diameter than either of those bores, is formed in the end 32 of housing portion 28; and the beamsplitter plate 42 is adapted to fit into counterbore 60. Because of the 45° angle of face 32 relative to the axes of the intersecting bores, those bores form an essentially elliptical intersection 62, as seen in FIG. 5. An aluminum surface 64 is provided, against which the peripheral portions of the surface of beamsplitter plate 42 are held. It is this aluminum surface 64 whose friction against the beamsplitter plate 42, during thermal changes, may cause distortion of the plate, and misalignment of the interferometer.

As seen in both FIGS. 3 and 5, an opening 56 at the top of each interferometer bore is provided as a laser beam path.

One theory concerning the extent of problems caused by friction between the beamsplitter plates and the aluminum surfaces is that the latter, no matter how carefully machined to provide flat smooth surfaces, will have microgrooves and micro-bumps. These surface defects tend to "lock" into the softer beamsplitter plate material, temporarily restricting relative motion during thermal stress. The existence of such surface defects in the smoothness of the aluminum surface can be verified by microscopic observation. Presumably, such defects cause alternate sticking and slipping of the engaging surfaces, both during expansion and contraction. The beamsplitter material is subject to plastic deformation, i.e., it has very little elasticity, and therefore tends to deform permanently.

An additional factor in causing beamsplitter plate distortion is the difference in flatness of the engaging surfaces. Good milling technique can produce an aluminum surface that is flat to about 0.001 inch over the 2.5 in. diameter in the interferometer. The beamsplitter plate is flat to better than one-fourth of a wavelength of visible light (0.000005 in.). The relatively malleable KBr will tend to conform to the contour of the less flat aluminum.

A further consideration is the non-uniform amount of aluminum surface engaged by different portions of the beamsplitter plate. As shown in both FIGS. 3 and 5, the available aluminum surface is greater at the top and bottom than it is at the sides; and so the contact area of the beamsplitter plate varies. This creates a greater vertical than horizontal stretching force on the beamsplitter plate.

An early set of experiments to test the theory of friction-caused beamsplitter distortion involved three different beamsplitter mounting techniques. One used thin Mylar shims between the KBr and aluminum surfaces; another used Teflon tape shims; and the third used no shims. The Teflon tape generally provided the best results. At the time, this was surprising, because previous experiments with Gore-Tex, a puffy Teflon product, had been unsuccessful. The difference in performance presumably was due to the relative thinness of the Teflon tape compared to the GoreTex. Unfortunately, efforts to duplicate the initial favorable results using Teflon tape were not particularly successful.

The analysis of the problem led to experimenting with Teflon coating on the aluminum surfaces 54 (FIG. 3) and 64 (FIG. 5). Teflon is one of the several trademarks/tradenames used to identify polytetrafluoroethylene materials (TFE-FEP). The results of such experiments, however, did not match those of the original Teflon tape. Efforts to improve the flatness of the coated surface by rubbing the surface had some value, but were not particularly significant.

In general, however, the conclusion had been reached that the aluminum surfaces needed to be coated in such a way as to obtain (a) very low friction, and (b) almost perfect flatness. The TFE-FEP coating material includes a binder which is needed to cause the TFE-FEP material to adhere to the aluminum. Fortunately, during the process of heating and solidifying the Teflon/binder composition, the binder migrates toward the aluminum, and the Teflon migrates toward the top, providing a very slippery (low friction) surface for beamsplitter plate engagement. Increasing the heating temperature caused better Teflon flow, improving the surface slickness. However, the flatness problem was not yet fully solved. Polishing the Teflon coating tended to improve the flatness, but also tended to reduce the surface slickness.

The preferred solution, based on present information, uses a series of process steps, as illustrated by FIGS. 6–12. Teflon/binder material is applied to the aluminum surface as a liquid coating. It may conveniently be sprayed onto the aluminum surface. Then the element is heated to cause a partial hardening of the coating, sufficiently to retain it in position. The surface of the coating is polished to provide a relatively flat surface. Thereafter, a final heating step is performed, during which the top surface of the Teflon coating is under pressure from a smooth, flat glass tool. The tool has been optically ground and polished to be optically flat. After final heating, with the glass tool exerting pressure, the Teflon surface is essentially optically flat. This surface provides the flat, slippery surface against which the beamsplitter plate is held in the interferometer.

Figure 6:
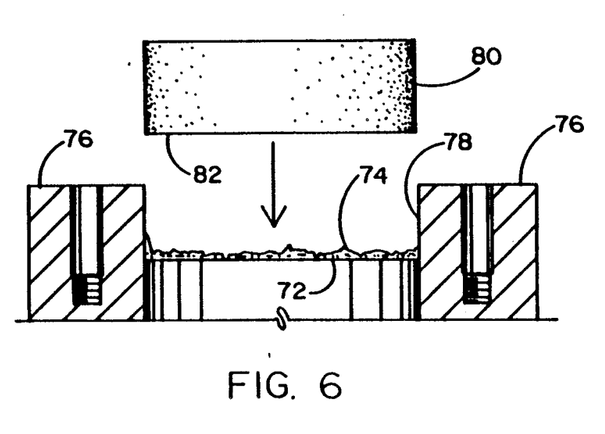
FIGS. 6-12 illustrate successive steps in forming the coating on the aluminum end surface of the two housing portions.
Figure 7:
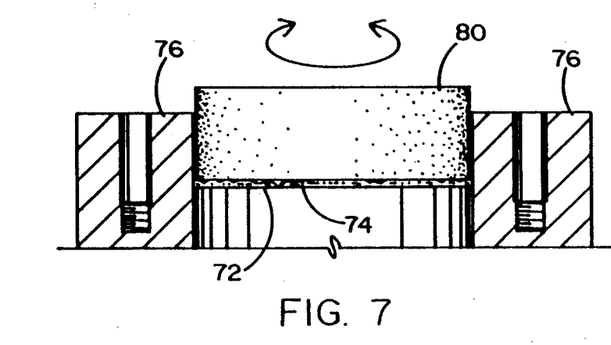

The dimensions in FIGS. 6–12 are not intended to conform to the actual dimensions of the coated metal surfaces, but merely to illustrate the succession of process steps. FIG. 6 shows a metal (e.g., aluminum) surface 72, on which a layer of coating material 74 (preferably teflon/binder material) has been (a) sprayed on, and (b) heated sufficiently to cause partial hardening. The layer 74 of coating material is confined by the sides of the metal housing structure 76, in which a counterbore 78 has been formed.

Figure 8:
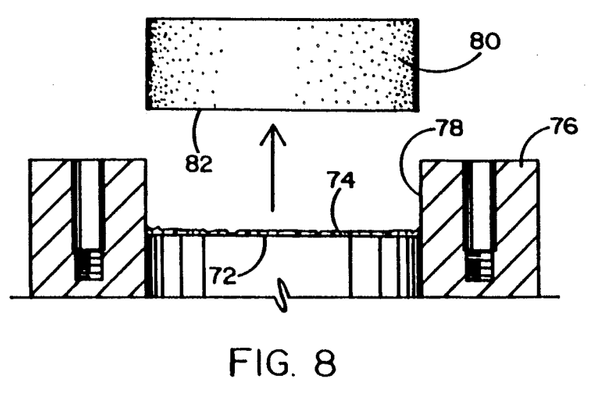

A suitable first heating phase to partially harden the coating 74 may be performed at approximately 100° C. for approximately one-half hour. The resulting coating layer 74 is shown in FIG. 6 having a top surface of exaggerated unevenness. The next process step is grinding the top surface of the coating 74 (in FIG. 7) by rotating a suitable tool 80, having an abrasive flat lower surface 82. After removal of the tool 80, as shown in FIG. 8, the top surface of the coating 74 is smoother and flatter. However, it is not as flat as desired, and is rougher than desired because of the grinding.

Figure 9:
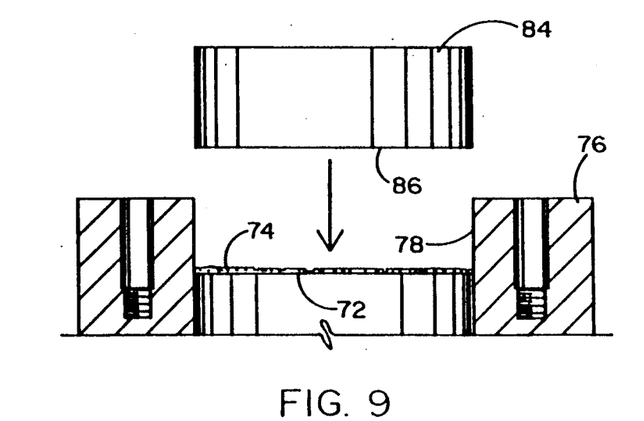
Figure 10:
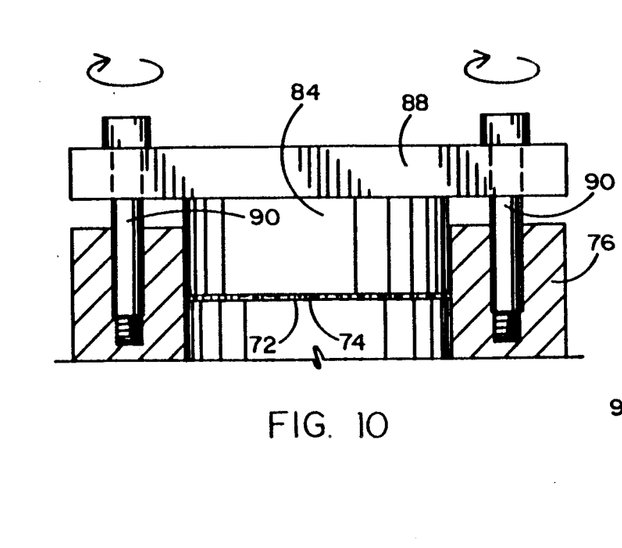

FIG. 9 shows another tool 84, which is a glass member having an optically flat lower surface 86. This glass surface 86 is held tightly against the upper surface of coating 74 during the second (and final) heating phase, which fully hardens the coating. This heating phase may be performed at approximately 200° C. for approximately one-half hour. In FIG. 10, the optical flat 84 is shown inserted in the counterbore during the second heating phase. Downward pressure is exerted on optical plate 84 by a metal plate 88, which is placed under pressure by threaded members 90 inserted into openings in the housing structure 76. A suitable downward pressure on the glass optical flat 84 is approximately 25 inch-pounds.

Figure 11:
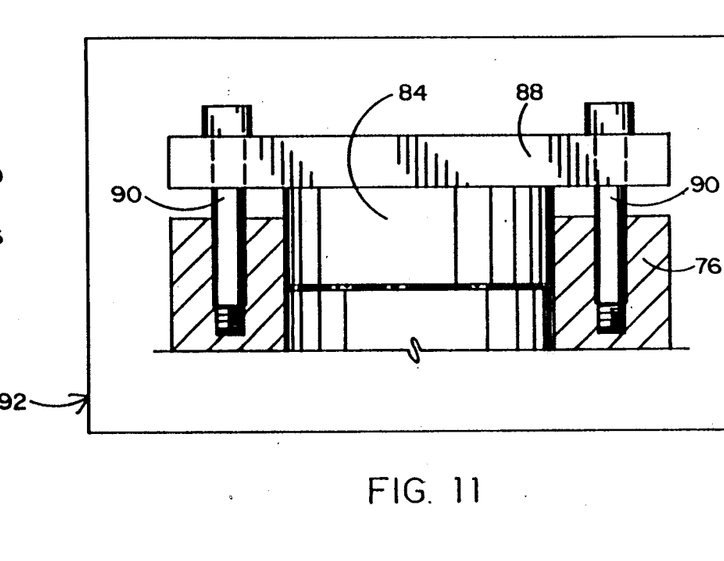
Figure 12:
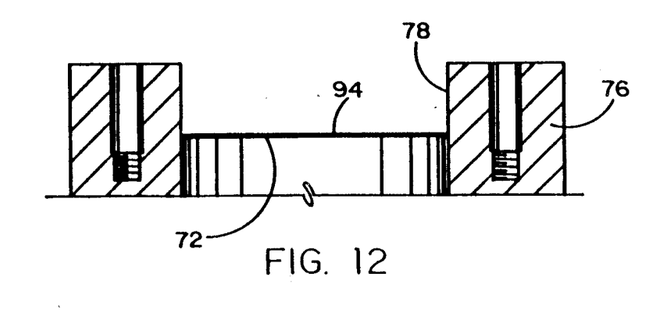

FIG. 10 illustrates the tightening of threaded members 90; and FIG. 11 illustrates the heating step inside an oven 92. Because of the pressure of optical flat 84 on the coating material while it is being further hardened under heat, and because of the extreme flatness of the lower surface 86 of optical flat 84, the final upper surface 94 of the coating, as seen in the FIG. 12, is extremely flat compared to any surface previously provided for contact with a beamsplitter plate.

Thus the coating surface 94 provides a very slippery, very flat beamsplitter-plate-engaging surface, which minimizes distortion of the beamsplitter plate due to any relative movement between the plate and the coating. Another advantage of the coating 94 as the beamsplitter-plate-engaging surface is its relative "softness," or malleability, as compared to the aluminum surface. This characteristic of the coating material permits it to conform more readily to the surface of the beamsplitter plate, and thus tends to prevent deformation of the beamsplitter plate due to mechanical retention pressure, which may cause such deformation even in the absence of thermally-induced expansion and contraction.

One additional problem was observed after providing the very slippery, very flat coating on the beamsplitter-plate-engaging surface. After investigation, it was determined that any gap between the outer periphery of the glass tool 84 and the inner periphery of the counterbore 78 would leave a substantially bevel-shaped raised edge on the periphery of the coating surface 94. The solution used to avoid this problem is to compensate by forming a matching bevel groove on the periphery of surface 86 of glass tool 84. This compensation insures full engagement (FIG. 11) of the lower surface 86 of tool 84 with the upper surface 94 of coating 74.

From the foregoing description, it will be apparent that the process and product disclosed in this application will provide the significant functional benefits summarized in the introductory portion of the specification.

The following claims are intended not only to cover the specific embodiments and methods disclosed, but also to cover the inventive concepts explained herein with the maximum breadth and comprehensiveness permitted by the prior art.

What is claimed is:

1. For use in a two-arm interferometer having a beamsplitter which (a) divides and recombines radiation traveling along the two arms, and (b) includes two transparent plates, a method of mounting the beamsplitter to minimize beamsplitter-caused alignment problems, comprising:
   providing supporting surfaces in the interferometer against which outer portions of the beamsplitter plates are retained;
   covering the retaining surfaces against which the beamsplitter plates are retained with an inherently slippery coating material; and
   applying heat and pressure to said coating material to cause its hardening and flattening, so as to provide a beamsplitter-plate-engaging surface having lower friction and truer flatness than would be obtainable with the non-coated surface.

2. The method of claim 1 in which the coating material is a mixture of a binder material and polytetrafluoroethylene.

3. The method of claim 1 in which the process of applying heat and pressure to the coating material comprises:
   heating the coating material to partially harden it;
   then grinding the top surface of the coating material to cause flattening;
   then placing the coating material under pressure from a tool having an extremely flat coating-engaging surface; and
   again heating the coating material to fully harden it while under the pressure of said tool.

4. The method of claim 3 in which the tool is a glass optical flat.

5. The method of claim 2 in which heating the coating material tends to cause migration of the binder material toward the supporting surface and migration of the polytetrafluoroethylene material toward the beamsplitter-plate-engaging surface.

6. The method of claim 1 in which the process of applying heat and pressure to the coating material comprises:
   placing the coating material under pressure from a tool having a coating-engaging surface whose flatness is substantially truer than that of the coated surface; and
   heating the coating material to harden it while under the pressure of said tool.

7. The method of claim 1 in which:
   the interferometer structure is formed by connecting together two housing portions whose junction is located at the beamsplitter; and
   the supporting surfaces, against which the beamsplitter plates are retained, are formed by counterboring the adjacent ends of the respective housing portions.

8. In a two-arm interferometer structure having a moving mirror in one arm, and a non-moving mirror in the other arm; a beamsplitter and beamsplitter mounting structure comprising:
   two beamsplitter plates, each formed of a relatively malleable transparent material;
   two beamsplitter plate retaining surfaces located in the interferometer structure, each of which is a flat surface against which the outer portion of the respective beamsplitter plate is held in the interferometer structure; and
   coatings applied to each of said flat surfaces which create beamsplitter plate engaging surfaces having better slipperiness and truer flatness characteristics than those obtainable with said flat surfaces.

9. The interferometer structure of claim 7 in which the coatings include polytetrafluoroethylene.

10. The interferometer structure of claim 8 in which the beamsplitter plate engaging surfaces have substantially the flatness of an optically flat surface.

11. The interferometer structure of claim 8, in which the interferometer structure comprises:
    two housing portions secured together along surfaces in the plane of the beamsplitter; and
    surfaces formed in the adjacent ends of the respective housing portions, each of which provides the retaining surface for one of the beamsplitter plates.

12. In an interferometer structure having a first arm containing a moving mirror, and a second arm containing a non-moving mirror; a beamsplitter and beamsplitter mounting structure comprising:
    two beamsplitter plates, each formed of a transparent material;
    two beamsplitter plate retaining and supporting structures formed in the respective interferometer arms, each having a flat surface against which the outer portion of the respective beamsplitter plate is held in the interferometer structure; and coatings applied to each of said flat surfaces which create beamsplitter plate engaging surfaces having better slipperiness and truer flatness characteristics than those obtainable with said flat surfaces.

13. For use in an interferometer having a moving mirror in one interferometer arm, a non-moving mirror in the other interferometer arm, and a beamsplitter for dividing and recombining radiation along the two arms, the beamsplitter including two transparent plates; a method of mounting the beamsplitter to minimize beamsplitter-caused alignment problems, comprising:

forming a first housing portion for one of the mirrors, said housing portion having an end surface with a recess therein adapted to retain the first beamsplitter plate;

forming a second housing portion for the other mirror, said second housing portion having an end surface with a recess therein adapted to retain the second beamsplitter plate;

the end surfaces of the two housing portions being adapted to engage one another and be secured together in the interferometer, and each having a surface against which peripheral portions of the respective beamsplitter plate are supported;

covering such beamsplitter plate supporting surfaces with an inherently slippery coating material; and applying heat and pressure to said coating material to cause its hardening and flattening, so as to provide a beamsplitter-plate-engaging surface having lower friction and truer flatness than would be obtainable with the noncoated surface.

* * * * *

UNITED STATES PATENT AND TRADEMARK OFFICE
CERTIFICATE OF CORRECTION

PATENT NO. : 5,002,394

DATED : March 26, 1991

INVENTOR(S) : Auth

It is certified that error appears in the above-identified patent and that said Letters Patent is hereby corrected as shown below:

Column 8, lines 31-33: Delete "having a moving mirror in one arm, and a non-moving mirror in the other arm", and insert instead -- providing separate optical paths in the two arms, the relative lengths of said optical paths being variable for scanning purposes --.

Column 8, lines 58-60: Delete "a first arm containing a moving mirror and a second arm containing a non-moving mirror", and insert instead -- first and second arms providing separate optical paths, the relative lengths of said optical paths being variable for scanning purposes --.

UNITED STATES PATENT AND TRADEMARK OFFICE
CERTIFICATE OF CORRECTION

PATENT NO. : 5,002,394

DATED : March 26, 1991

INVENTOR(S) : Auth

It is certified that error appears in the above-identified patent and that said Letters Patent is hereby corrected as shown below:

Column 9, lines 6-8: Delete "a moving mirror in one interferometer arm, a non-moving mirror in the other interferometer arm", and insert instead -- first and second interferometer arms providing separate optical paths, the relative lengths of said paths being variable for scanning purposes --.

Signed and Sealed this

Twenty-fifth Day of August, 1992

Attest:

DOUGLAS B. COMER

*Attesting Officer*   *Acting Commissioner of Patents and Trademarks*